(12) United States Patent
Jeong (10) Patent No.: US 8,875,018 B2
(45) Date of Patent: Oct. 28, 2014

(54) TERMINAL AND METHOD FOR PROVIDING SEE-THROUGH INPUT

(75) Inventor: Wookyung Jeong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 222 days.

(21) Appl. No.: 12/938,223

(22) Filed: Nov. 2, 2010

(65) Prior Publication Data

US 2011/0107212 A1  May 5, 2011

(30) Foreign Application Priority Data

Nov. 5, 2009 (KR) ........................ 10-2009-0106446

(51) Int. Cl.
*G06F 3/01* (2006.01)
*G06F 3/0481* (2013.01)
*G06F 3/0488* (2013.01)

(52) U.S. Cl.
CPC .... *G06F 3/0488* (2013.01); *G06F 2203/04804* (2013.01); *G06F 3/0481* (2013.01); *G06F 2203/04105* (2013.01)
USPC ........................................................ 715/702

(58) Field of Classification Search
None
See application file for complete search history.

(56) References Cited

U.S. PATENT DOCUMENTS

| | | | | |
|---|---|---|---|---|
| 5,651,107 A * | 7/1997 | Frank et al. | .................... | 715/768 |
| 5,933,141 A * | 8/1999 | Smith | ............................. | 725/39 |
| 6,246,407 B1 * | 6/2001 | Wilks et al. | .................... | 715/803 |
| 6,384,840 B1 * | 5/2002 | Frank et al. | .................... | 345/634 |
| 6,429,883 B1 * | 8/2002 | Plow et al. | .................... | 715/768 |
| 6,587,128 B2 * | 7/2003 | Kanevsky et al. | ............ | 715/768 |
| 6,670,970 B1 * | 12/2003 | Bonura et al. | ................. | 715/768 |
| 7,724,208 B1 * | 5/2010 | Engel et al. | ........................ | 345/4 |
| 7,937,726 B2 * | 5/2011 | Nashida et al. | ................. | 725/46 |
| 7,956,869 B1 * | 6/2011 | Gilra | ............................. | 345/592 |
| 8,166,417 B2 * | 4/2012 | Iijima | ........................ | 715/802 |
| 8,179,338 B2 * | 5/2012 | Engel et al. | ........................ | 345/4 |
| 8,495,514 B1 * | 7/2013 | Ludolph et al. | ................. | 715/768 |
| 8,601,384 B2 * | 12/2013 | Chaudhri et al. | .............. | 715/768 |
| 2002/0089546 A1 * | 7/2002 | Kanevsky et al. | ............ | 345/800 |
| 2003/0142108 A1 * | 7/2003 | Brown et al. | .................. | 345/589 |
| 2003/0142133 A1 * | 7/2003 | Brown et al. | .................. | 345/768 |
| 2004/0201608 A1 * | 10/2004 | Ma et al. | ........................ | 345/719 |
| 2006/0132455 A1 * | 6/2006 | Rimas-Ribikauskas et al. | ............. | 345/173 |
| 2006/0242607 A1 * | 10/2006 | Hudson | ......................... | 715/863 |
| 2007/0067798 A1 * | 3/2007 | Wroblewski | ..................... | 725/37 |
| 2008/0122796 A1 * | 5/2008 | Jobs et al. | ..................... | 345/173 |
| 2008/0195969 A1 * | 8/2008 | Brown et al. | .................. | 715/802 |
| 2008/0256467 A1 * | 10/2008 | Chu et al. | ...................... | 715/762 |
| 2009/0027334 A1 * | 1/2009 | Foulk et al. | .................... | 345/157 |
| 2009/0031237 A1 * | 1/2009 | Jessen et al. | .................... | 715/768 |
| 2009/0138811 A1 * | 5/2009 | Horiuchi et al. | .............. | 715/768 |

(Continued)

OTHER PUBLICATIONS iPhone User Guide (Software Version 1.1.2 Oct. 2, 2007).*

*Primary Examiner* — Matt Kim
*Assistant Examiner* — Maryam Ipakchi
(74) *Attorney, Agent, or Firm* — H.C. Park & Associates, PLC (57) ABSTRACT

A terminal and a method for providing a see-through input provide intuitive control of a plurality of applications. The terminal may include a touchscreen to display a first application and a second application and to sense occurrence of a touch and generate a touch signal; and a control unit to determine whether the touch signal is a general input for the first application or a see-through input for the second application and to execute a function of an application corresponding to the general input or the see-through input.

19 Claims, 7 Drawing Sheets

(56) References Cited

U.S. PATENT DOCUMENTS

| | | | |
|---|---|---|---|
| 2009/0256809 A1* | 10/2009 | Minor | 345/173 |
| 2010/0235735 A1* | 9/2010 | Ording et al. | 715/702 |
| 2010/0269030 A1* | 10/2010 | Dugonjic et al. | 715/207 |
| 2010/0295817 A1* | 11/2010 | Nicholson et al. | 345/174 |
| 2010/0323762 A1* | 12/2010 | Sindhu | 455/566 |
| 2011/0069017 A1* | 3/2011 | Victor | 345/173 |
| 2011/0074698 A1* | 3/2011 | Rapp et al. | 345/173 |
| 2011/0107212 A1* | 5/2011 | Jeong | 715/702 |
| 2011/0187655 A1* | 8/2011 | Min et al. | 345/173 |

* cited by examiner

TERMINAL AND METHOD FOR PROVIDING SEE-THROUGH INPUT

CROSS-REFERENCE TO RELATED APPLICATION

This application claims priority from and the benefit of Korean Patent Application No. 10-2009-0106446, filed on Nov. 5, 2009, which is hereby incorporated by reference for all purposes as if fully set forth herein.

BACKGROUND

1. Field

Exemplary embodiments of the present invention relate to a terminal having a touchscreen, and more particularly, to a terminal and a method for providing a see-through input on a touchscreen.

2. Discussion of the Background

Recently, mobile terminals, such as MP3 players, portable media players, mobile communication terminals, and multimedia game consoles, are provided with a multitasking function. Multitasking may include simultaneous performance of at least two applications. However, conventional mobile terminals which support multitasking generally have different input methods for different applications.

For example, portable media players may have various functions for playing music, reproducing a moving image, for viewing a picture and a file, for receiving radio, and the like. In this instance, when a user listening to music wants to view a picture, the user should terminate the music playing function, return to a menu, and enter a text or picture mode.

To overcome the conventional problem, suggestions have been made to use a separate key for each corresponding mode.

However, as the recent trend of mobile terminals moves toward touch-operated input, touch-operated input user interfaces (UIs) are increasingly used instead of keys.

SUMMARY

Exemplary embodiments of the present invention provide a terminal and a method for providing a see-though input on a touchscreen to intuitively control a plurality of applications.

Exemplary embodiments of the present invention provide a terminal and a method for providing a see-though input on a touchscreen to directly control a second application irrespective of a first application.

Additional features of the invention will be set forth in the description which follows, and in part will be apparent from the description, or may be learned by practice of the invention.

An exemplary embodiment of the present invention discloses a terminal to provide a see-though input, the terminal including a touchscreen to display a first application and a second application, to sense occurrence of a touch, and generate a touch signal in response to a sensed touch; and a control unit to determine whether the sensed touch is a general input for the first application or a see-through input for the second application according to the generated touch signal, and to execute a function of the first application according to the general input or a function of the second application according to the see-through input according to the determination, wherein a transparency of the first application is varied and the first application is displayed on the touchscreen to at least partially overlap the second application.

Another exemplary embodiment of the present invention discloses a terminal to provide a see-though input, the terminal including a touchscreen to display an input user interface (UI) and an application, to sense occurrence of a touch, and to generate a touch signal in response to a sensed touch; and a control unit to determine whether the sensed touch is a general input for the input UI or a see-through input for the application according to the generated touch signal, and to execute a function of the input UI corresponding to the general input or a function of the application corresponding to the see-through input according to the determination, wherein a transparency of the input UI is varied and the input UI is displayed on the touchscreen to at least partially overlap the application.

Another exemplary embodiment of the present invention discloses a method for providing a see-through input by a terminal with a touchscreen, the method including displaying a first application and a second application on the touchscreen; sensing occurrence of a touch and generating a touch signal in response to a sensed touch; determining whether the sensed touch is a general input for the first application or a see-through input for the second application according to the generated touch signal; executing a function of the first application if the touch signal is the general input; and executing a function of the second application if the touch signal is the see-through input, wherein a transparency of the first application is varied and the first application is displayed on the touchscreen to at least partially overlap the second application.

Another exemplary embodiment of the present invention discloses a non-transitory computer-readable media including program instructions to implement a method embodied by a terminal with a touchscreen, the terminal for providing a see-through input, the operation method including displaying a first application and a second application; sensing occurrence of a touch and generating a touch signal in response to a sensed touch; determining whether the sensed touch is a general input for the first application or a see-through input for the second application according to the generated touch signal; executing a function of the first application if the touch signal is the general input; and executing a function of the second application if the touch signal is the see-through input, wherein a transparency of the first application is varied and the first application is displayed on the touchscreen to at least partially overlap the second application.

Another exemplary embodiment of the present invention discloses a terminal to provide a see-through input, the terminal including a touchscreen to display a first application and a second application, the first application being at least partially transparent and at least partially overlapping the second application; and a control unit to determine whether an input is a first input for the first application or a second input for a second application.

Another exemplary embodiment of the present invention discloses a method for providing a see-through input by a terminal with a touchscreen, the method including displaying a first application and a second application on the touchscreen, the first application being at least partially transparent and at least partially overlapping the second application; determining whether an input is a first input for the first application or a second input for the second application.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof Further, throughout this disclosure, at least two of the described elements may be incorporated in one element or one element may be divided into at least two sub-elements.

Figure 1:
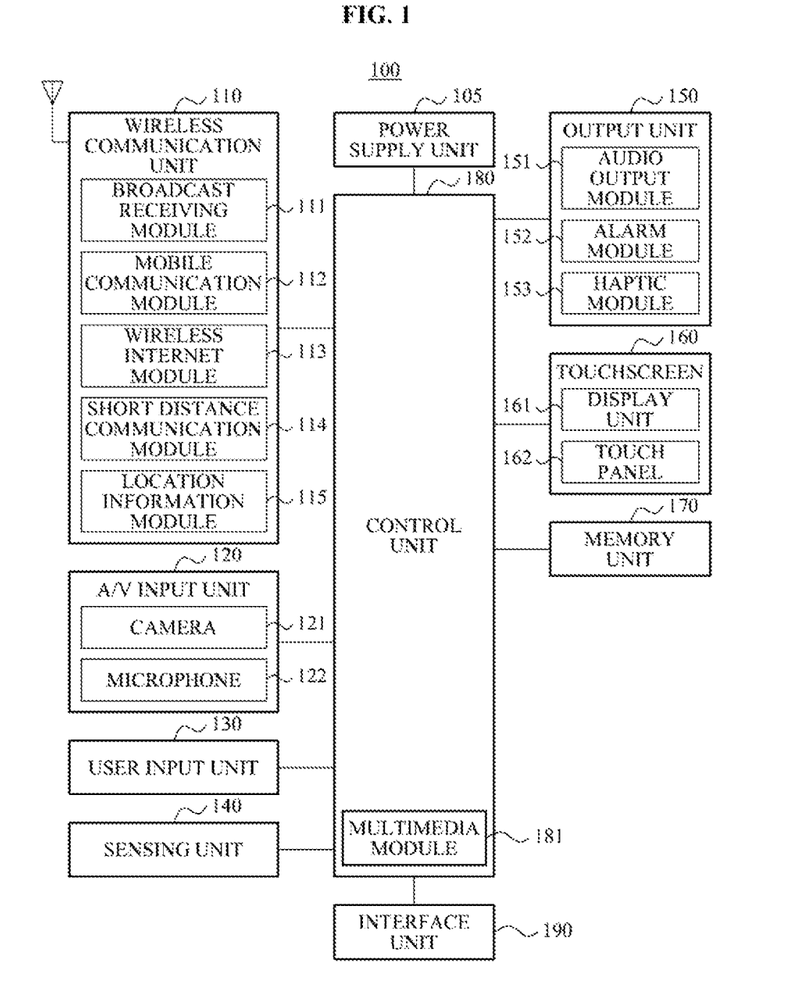
FIG. 1 is a block diagram illustrating a mobile terminal according to an exemplary embodiment of the present invention.

FIG. 1 is a block diagram illustrating a mobile terminal 100 according to an exemplary embodiment of the present invention.

The mobile terminal 100 may include at least one of a wireless communication unit 110, an audio/video (A/V) input unit 120, a user input unit 130, a sensing unit 140, an output unit 150, a touchscreen 160, a memory unit 170, an interface unit 190, a control unit 180, and a power supply unit 105.

The mobile terminal 100 of FIG. 1 is only an exemplary embodiment, and aspects of the present invention are not limited thereto such that mobile terminal 100 may include a larger number of elements or a smaller number of elements.

Referring to FIG. 1, the wireless communication unit 110 may include at least one module for enabling a wireless communication between the mobile terminal 100 and a wireless communication system or between the mobile terminal 100 and other mobile terminals. For example, the wireless communication unit 110 may include at least one of a broadcast receiving module 111, a mobile communication module 112, a wireless Internet module 113, a short distance communication module 114, and a location information module 115.

The broadcast receiving module 111 may receive a broadcast signal and/or data related to broadcasting from an external broadcast management server via a broadcast channel. The broadcast receiving module 111 may receive a broadcast signal using various kinds of broadcast systems, for example, a digital broadcast signal using a digital broadcast system, such as digital multimedia broadcasting-terrestrial (DMB-T), digital multimedia broadcasting-satellite (DMB-S), Media Forward Link Only (MediaFLO), digital video broadcast-handheld (DVB-H), integrated services digital broadcast-terrestrial (ISDB-T) and the like. The broadcast receiving module 111 may be adapted to other broadcast systems for providing a broadcast signal, as well as the digital broadcast systems.

The broadcast signal and/or the data related to broadcasting transmitted from the broadcast receiving module 111 may be stored in the memory unit 170.

The wireless internet module 113 may be a module for a wireless Internet access, and may be mounted inside or outside of the mobile terminal 100. Available wireless internet techniques may include wireless local area network (WLAN), wireless fidelity (Wi-Fi), wireless broadband (WiBro), Worldwide Interoperability for Microwave Access (WiMAX), high speed downlink packet access (HSDPA), and the like.

The short distance communication module 114 may be a module for a short distance communication. Available short distance communication techniques may include Bluetooth, radio frequency identification (RFID), infrared data association (IrDA), ultra wideband (UWB), ZigBee, and the like.

The location information module 115 may be a module for identifying or obtaining a location of the mobile terminal 100. For example, the location information module 115 may be a global position system (GPS) module.

The A/V input unit 120 may be configured to input an audio signal or a video signal, and may include a camera 121 and/or a microphone 122.

The user input unit 130 may generate user input data for controlling the operation of the mobile terminal 100. The user input unit 130 may include at least one of a keypad, a dome switch, a jog wheel, and a jog switch.

The sensing unit 140 may sense the current state of the mobile terminal 100, for example, opening/closing of the mobile terminal 100, a location of the mobile terminal 100, contact/non-contact with a user, orientation of the mobile terminal 100, acceleration/deceleration of the mobile terminal 100, and the like, and generate a sensing signal for controlling the operation of the mobile terminal 100.

The output unit 150 may be configured to generate an audio output or a haptic output. The output unit 150 may include at least one of an audio output module 151, an alarm module 152, and a haptic module 153.

The audio output module 151 may output audio data received from the wireless communication unit 110 in a call signal receiving mode, a call or recording mode, a voice recognizing mode or a broadcast receiving mode, or may output audio data stored in the memory unit 170. The audio output module 151 may output an audio signal related to a function of the mobile terminal 100, such as a call signal receiving sound, a message receiving sound, and the like. For example, the audio output module 151 may be a receiver, a speaker, or a buzzer.

The alarm module 152 may output a signal for notification regarding an event occurring, in the mobile terminal 100. The event occurring in the mobile terminal 100 may be, for example, call signal receiving, message receiving, key signal input, touch input, and the like.

The haptic module 153 may output various haptic effects recognized by a user. The haptic effect generated by the haptic module 153 may include vibration. The haptic module 153 may output various types of vibration by controlling the intensity or pattern of vibration. The haptic module 153 may combine various types of vibration or sequentially output various types of vibration.

In addition to vibration, the haptic module 153 may generate various haptic effects, for example, an effect by stimulation of a pin array to provide a vertical motion relative to the contacted skin, an effect by stimulation caused by an air jet or air absorption through an air jet port or an air absorption port, an effect by stimulation caused by rubbing the skin, an effect by stimulation caused by contact of an electrode, an effect by stimulation using an electromagnetic force, an effect by generating a hot or cold feeling using a heat absorbing or generating device.

The touchscreen 160 may include a display unit 161 and a touch panel 162. The display unit 161 may display data processed by the mobile terminal 100. If the mobile terminal 100 is in a call mode, the display unit 161 may display, for example, a user interface (UI) or a graphic user interface (GUI) related to a call. The display unit 161 may be embodied as, for example, a light crystal display (LCD), and may include an LCD controller, a memory for storing data being displayed, an LCD device, and the like. For example, the display unit 161 may include an organic light emitting diode (OLED) display, and may include an OLED controller, a memory for storing data being displayed, an OLED device, and the like.

The touch panel 162 may be provided at one or more sides of the display unit 161, and may sense a touch and generate a touch signal. Specifically, if a touch occurs, the touch panel 162 may sense a change in a physical quantity (pressure or electric capacity) and determine that a touch occurred. The touch panel 162 may generate a touch signal using the change in physical quantity.

Here, the touch signal may include at least one of location information of the touch, retention time information of the touch, drag information, touched area information, and pressure information of the touch.

The memory unit 170 may store programs for operating the control unit 180, and temporarily store input/output data (for example, a phonebook, a message, a still image, a moving image, and the like). The memory unit 170 may store data related to various types of vibration and sounds outputted when a touch is input on the touchscreen 160.

The interface unit 190 may serve as a bridge between the mobile terminal 100 and all external equipment connected to the mobile terminal 100. The interface unit 190 may receive data or power from the external equipment and transmit the same to each element of the mobile terminal 100. Also, the interface unit 190 may transmit data of the mobile terminal 100 to the external equipment.

The power supply unit 105 may receive external or internal power and supply the power to operate each element of the mobile terminal 100 under control of the control unit 180.

The control unit 180 may typically control the entire operation of the mobile terminal 100. For example, the control unit 180 may control and process the operations related to audio communication, data communication, video communication, and the like. The control unit 180 may include a multimedia module 181 for playing a multimedia file. The multimedia module 181 may be incorporated in the control unit 180 or be installed separately from the control unit 180.

Further, the control unit 180 may control the touchscreen 160 (more particularly, the display unit 161 of the touchscreen 160) to display a first application and a second application.

In this instance, the control unit 180 may change the transparency, or semi-transparency, of the first application and display the first application on the touchscreen 160 together with the second application. The control unit 180 may increase the transparency or semi-transparency of the first application and display the first application on the touchscreen 160 to at least partially overlap the second application such that the first application and the second application are each visible.

Also, the control unit 180 may determine whether a touch signal that is input by a user and generated on the touchscreen 160 is a general input for a first application or a see-through input for a second application.

Here, the see-through input may be one of a pressure-based touch greater than a specific pressure, a long touch where the touch is maintained for longer than a specific period of time, and a combination touch including a specific key input of the mobile terminal 100.

If a touch signal is a general input, the control unit 180 may execute a function of a first application based on the general input, and display a processing result of the first application on the touchscreen 160.

If a touch signal is a see-through input, the control unit 180 may execute a function of a second application based on the see-through input, and display a processing result of the second application on the touchscreen 160.

Hereinafter, exemplary embodiments of the present invention are described with reference to FIGS. 2 to 4.

Figure 2:
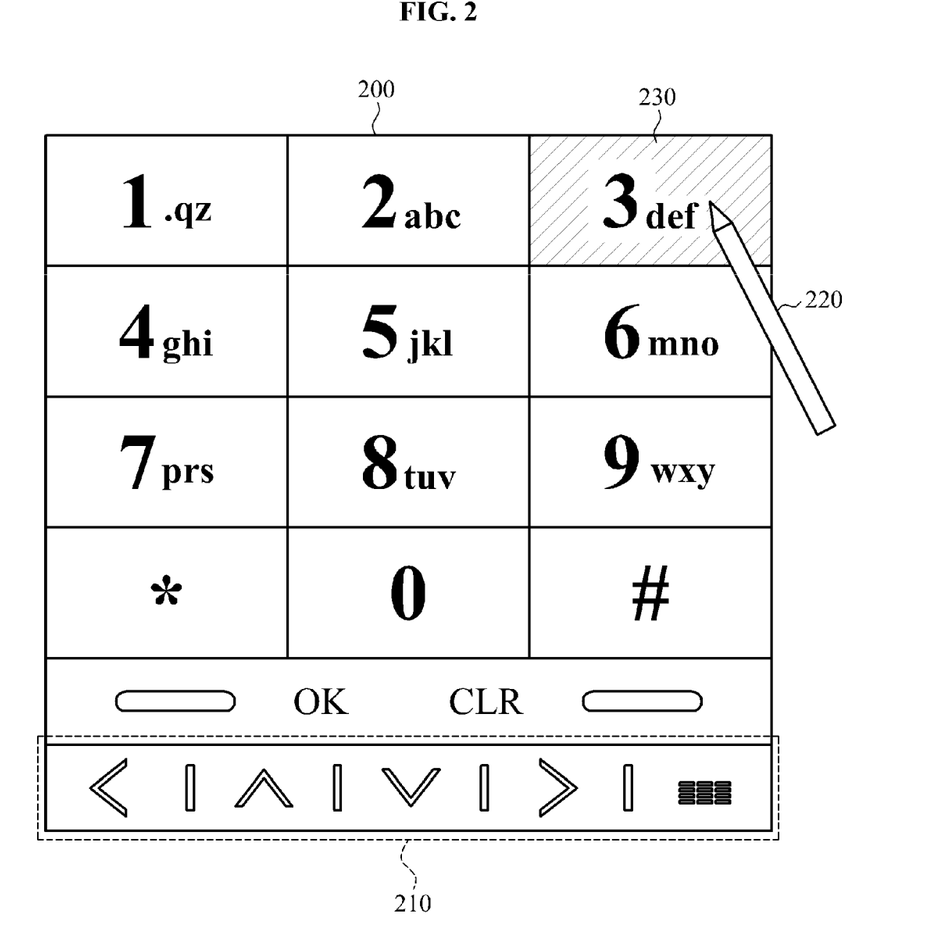
FIG. 2 illustrates an example of a first application in which a virtual keyboard is displayed on a mobile terminal.

FIG. 2 illustrates an example of a first application in which a virtual keyboard is displayed on the mobile terminal 100. FIG. 3 illustrates an example of a second application in which a specific web content is displayed on the mobile terminal 100 by a web browser. FIG. 4 illustrates a conventional touch input method.

Hereinafter, a UI for receiving a specific user input in the mobile terminal 100, or a program for processing a specific operation or displaying a specific result in the mobile terminal 100 is referred to as an application.

Referring to FIG. 2, a first application 200, for example, a virtual keyboard, is displayed on a touchscreen. The virtual keyboard may be an application because the virtual keyboard is a program and the UI is for receiving a specific input from a user.

A key 210 may be a virtual key for input on a touchscreen, or a separate physical key of the mobile terminal 100.

If a user touches a number '3' area 230 on the virtual keyboard with a touch pen 220, the number '3' area 230 may be changed. The mobile terminal 100 may input the number '3' in a specific application, or may process a command designated to the number '3'.

Although this embodiment of the present invention shows a user touches the touchscreen with the touch pen 220, aspects of the present invention are not limited thereto such that a user may touch the touchscreen with various kinds of tools, a human body including a finger, and the like.

Figure 3:
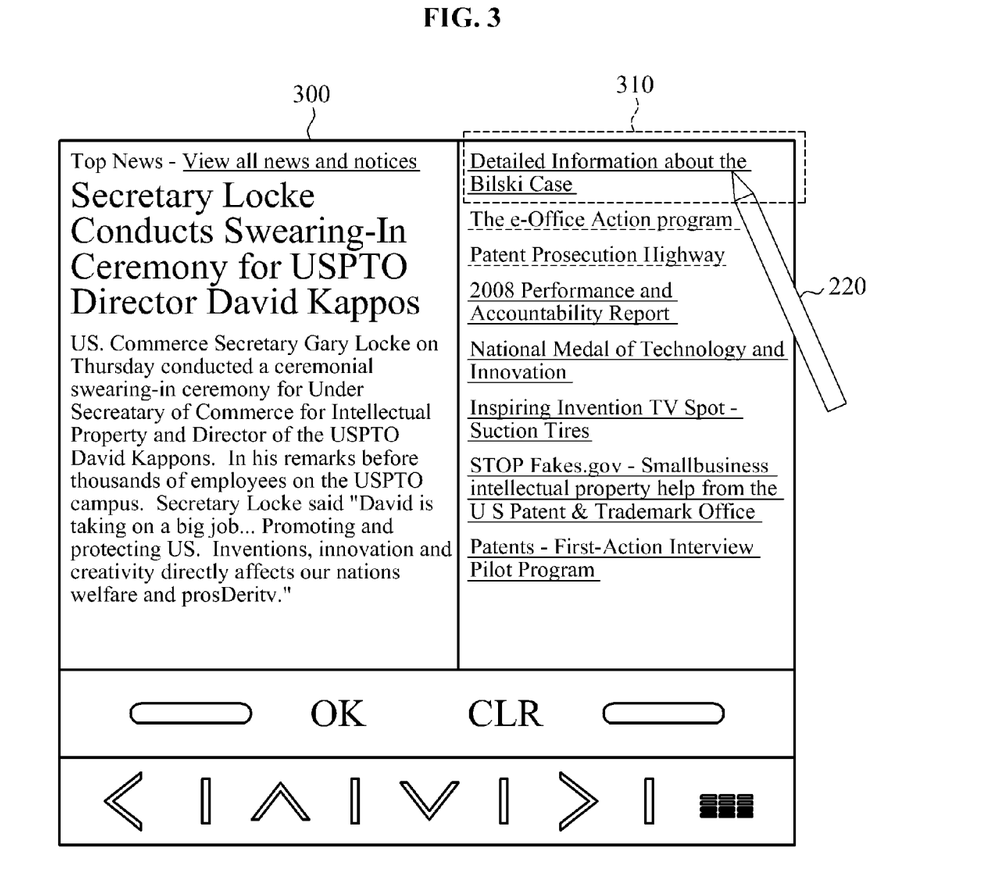
FIG. 3 illustrates an example of a second application in which a specific web content is displayed on a mobile terminal by a web browser.

Referring to FIG. 3, a second application 300, for example, a specific web content, is displayed on the mobile terminal 100 by a web browser. If a user touches an article area 310 with the touch pen 220, the mobile terminal 100 may display a web content, for example, the details of the article, corresponding to the touched location.

Figure 4:
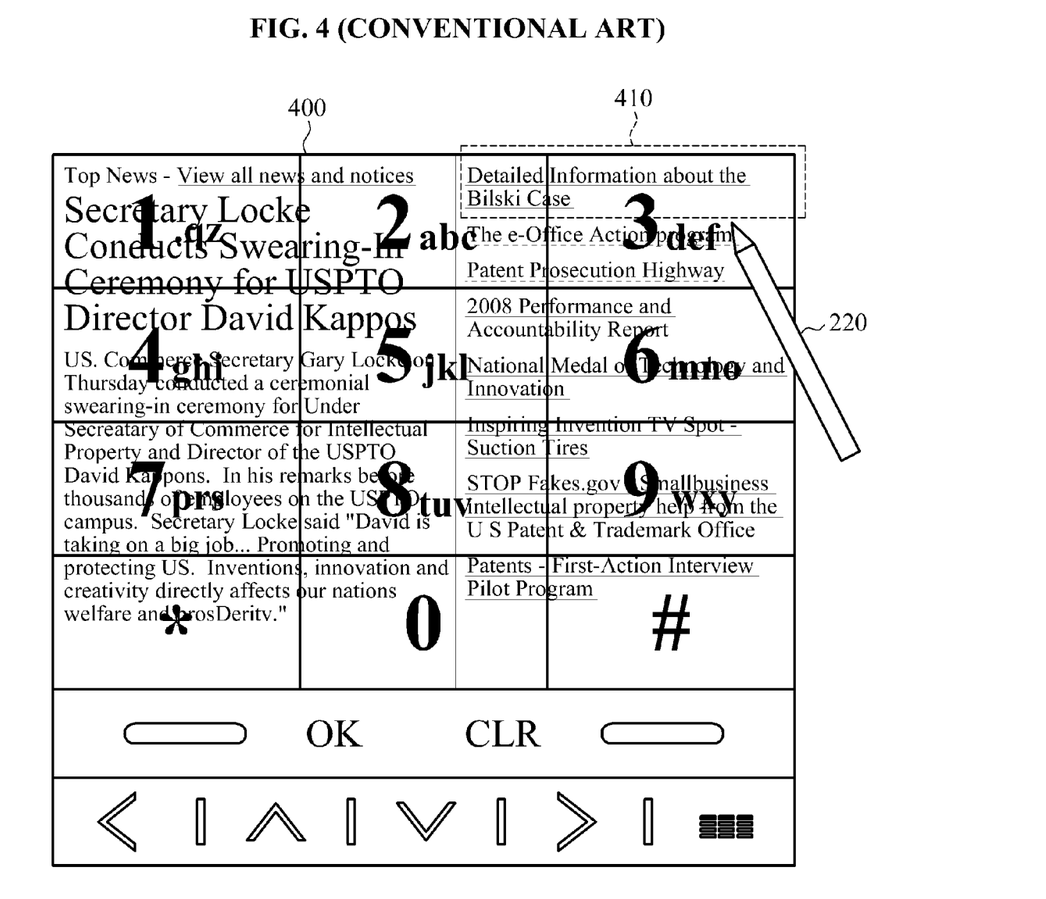
FIG. 4 illustrates a conventional touch input method.

In the case of a plurality of applications 400, a virtual keyboard as a first application 200 may be semi-transparently displayed and a web content may be displayed by a web browser as a second application 300, as shown in FIG. 4.

In this instance, each number key of the virtual keyboard may include a short URL or a designated command. Accordingly, if the user touches the number '3' area on the virtual keyboard, the mobile terminal 100 may access a URL designated 410 to the number '3' or process a command designated to the number '3'.

However, the target of processing is limited to the URL 410 or the command designated to the touched number '3'.

Specifically, if the plurality of applications 400, for example the virtual keyboard as the first application 200, the web content as the second application 300 are displayed on the mobile terminal 100, and a user touches a specific web content corresponding to the number '3' area of the virtual keyboard with the touch pen 220 to see the details of the web content 410, the mobile terminal 100 may recognize the touch on the number '3' area of the virtual keyboard as operation of the first application 200. Also, the mobile terminal 100 may input the number '3' of the virtual keyboard in a specific application or may process a URL 410 or a command designated to the number '3', regardless of the intention of the user. As a result, the user intended to see the details of a desired article 410 using a virtual keyboard but cannot.

Therefore, conventionally, the user should terminate the virtual keyboard as the first application 200 using a separate key or convert a window to the web browser as the second application 300, and then touch the specific web content 310 of FIG. 3 displayed only in the second application 300 to see the details of the web content 310.

Hereinafter, exemplary embodiments of the present invention are now described with reference to FIG. 5, FIG. 6, and FIG. 7.

Figure 5:
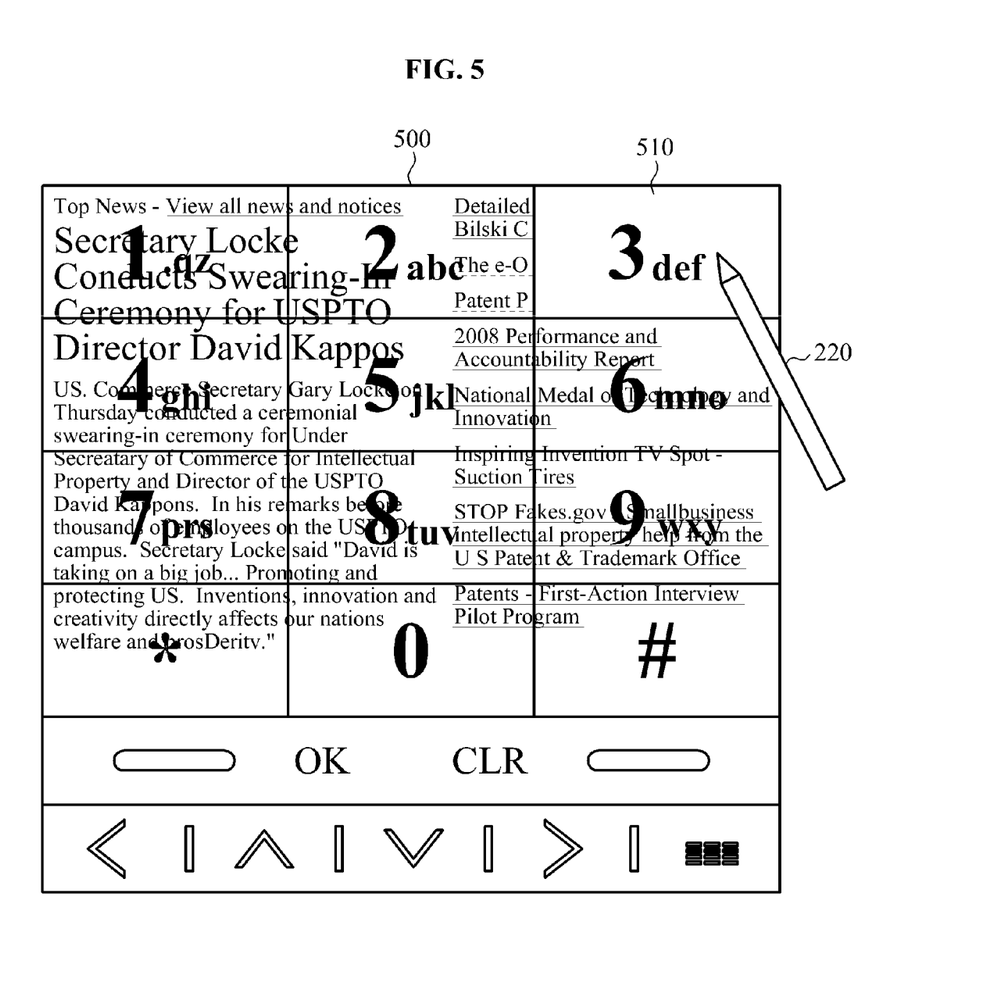
FIG. 5 illustrates a general input according to an exemplary embodiment of the present invention.
Figure 6:
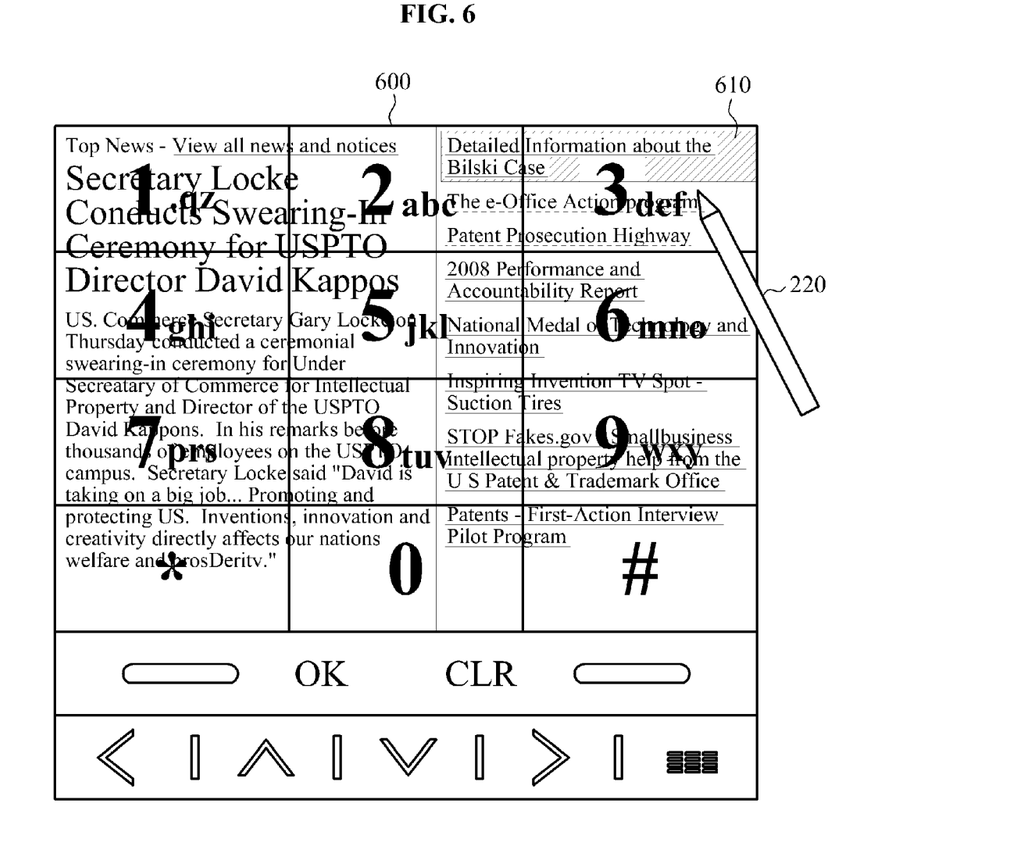
FIG. 6 illustrates a see-though input according to an exemplary embodiment of the present invention.

FIG. 5 illustrates a general input according to an exemplary embodiment of the present invention, and FIG. 6 illustrates a see-though input according to an exemplary embodiment of the present invention.

In this instance, the first and second applications are described based on the above assumption. That is, the first application may be a virtual keyboard, and the second application may be a web browser displaying a specific web content.

Here, a see-through input is defined as one of a pressure-based touch greater than a specific pressure, a long touch in which the touch is maintained for longer than a specific period of time, and a combination touch including a specific key input of the mobile terminal 100. All inputs other than the see-through input are defined as general inputs.

In the combination touch, the specific key input of the mobile terminal 100 may be an input using a key of the mobile terminal 100 or a touch input using a touch sensor installed at a side or a back of the mobile terminal 100.

According to an exemplary embodiment of the present invention, the control unit 180 may determine whether a touch signal generated on the touchscreen 160 is a see-through input.

If the touch signal is not a see-through input, the control unit 180 may execute a function of a first application based on the touch signal and display a processing result of the first application. For example, if a user touches a number '3' area 510 with the touch pen 220 as shown in FIG. 5, the control unit 180 may input a URL designated to the number '3' in a web browser as a second application, or may process a command (for example, execute a designated menu) designated to the number '3'.

If the touch signal is a see-though input, the control unit 180 may execute a function of a second application based on the see-through input.

For example, if a user performs a see-through input of an article area at the top right as shown in FIG. 6, the control unit 180 may operate a web browser as a second application based on the see-through input. In this instance, the control unit 180 may display a web content 610 corresponding to the touched area as a title, and if the web content 610 has a link to the details of the web content, the control unit 180 may control the web browser to display the details of the web content 610.

According to aspects of the present invention, the user may selectively control the second application, regardless of the first application.

Figure 7:
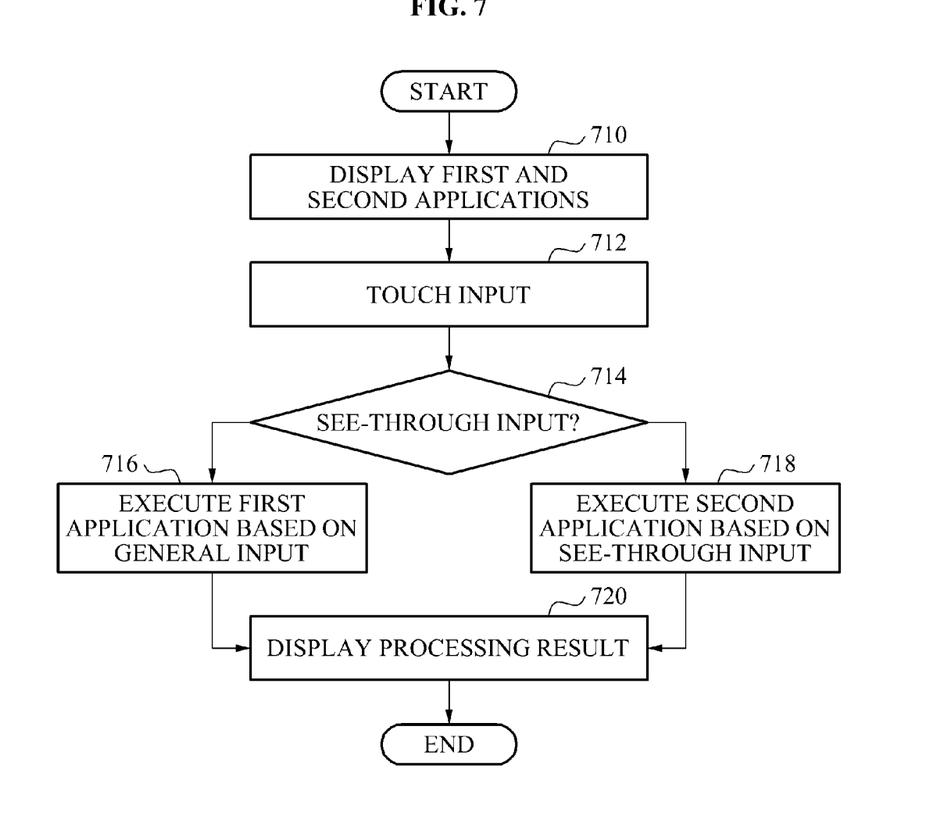
FIG. 7 is a flowchart illustrating a method for providing a see-though input on a touchscreen according to an exemplary embodiment of the present invention.

FIG. 7 is a flowchart illustrating a method for providing a see-through input on a touchscreen according to an exemplary embodiment of the present invention.

The method of FIG. 7 may be performed by the mobile terminal 100. In this instance, aspects of the present invention are not limited to a specific internal structure of the mobile terminal 100. The mobile terminal 100 may include various elements, as shown in FIG. 1, regardless of a name used to describe the elements.

Referring to FIG. 7, the mobile terminal 100 may display a first application and a second application to a user, in operation 710. In this instance, the mobile terminal 100 may vary the transparency of the first application and display the first application on the touchscreen 160 together with the second application. For example, the first application may be a virtual keyboard, and the second application may be a web browser.

The mobile terminal 100 may sense a touch input from the user and generate a touch signal, in operation 712.

The mobile terminal 100 may determine whether the touch signal is a see-through input, in operation 714. However, aspects are not limited thereto such that the mobile terminal may determine whether the touch signal is a general input, not a see-through input, or not a general input in operation 714.

In this instance, the see-through input may be one of a pressure touch greater than a specific pressure, a long touch where the touch is maintained for longer than a specific period of time, and a combination touch including a specific key input of the mobile terminal 100.

Here, in the combination touch, the specific key input of the mobile terminal 100 may be an input using a key of the mobile terminal 100 or a touch input using a touch sensor installed at the side or the back of the mobile terminal 100.

If the touch input is the see-through input, the mobile terminal 100 may execute a function of the second application based on the see-through input, in operation 718.

If the touch input is not the see-through input, the mobile terminal 100 may execute a function of the first application based on a general input, in operation 716.

The execution of the first application or the second application depending on the see-through input and the general input is described above with respect to the control unit 180.

Next, the mobile terminal 100 may display the processing result of the first application or the second application to the user, in operation 720.

The processing result of each application is as described above.

Although the first application is described as a virtual keyboard and the second application is described as a web browser, aspects of the present invention are not limited thereto such that the first application and second application may be any application executable by the mobile terminal.

For example, the first application may be an MP3 player program, and the second application may be a web browser. In this instance, the mobile terminal 100 may vary the transparency of the MP3 player program as the first application, and display the program to the user, together with the web browser as the second application. The mobile terminal 100 may control the MP3 player program as the first application based on a general input. Also, the mobile terminal 100 may control the web browser as the second application based on a see-through input. Accordingly, the user of the mobile terminal 100 may select and play a specific music selection using the general input, and surf the web using the see-through input or vice-versa.

As another example, the first application may be a program for transmitting a large-capacity mail, and the second application may be a picture viewing program. In this instance, the mobile terminal 100 may vary the transparency of the program for transmitting a large-capacity mail as the first application, and display the program to the user, together with the picture viewing program as the second application. The mobile terminal 100 may control the program for transmitting a large-capacity mail as the first application based a general input. Also, the mobile terminal 100 may control the picture viewing program as the second application based on a see-through input. Accordingly, the user of the mobile terminal 100 may select a specific picture to be transmitted using the see-through input while viewing pictures, and input the title of the selected picture using the general input and transmit the picture to another user. As described above, the user may directly and intuitively select a desired picture while viewing pictures, and transmit the selected picture to another user.

The method for providing a see-though input on a touchscreen according to the exemplary embodiments of the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include, but are not limited to, magnetic media, such as hard disks, floppy disks, and magnetic tape, and the like; optical media, such as compact disk read only memory (CD-ROM) disks, compact disk re-writable (CD-RW) disks, digital versatile disks (DVD), and the like; magneto-optical media, such as floptical disks; and specially configured hardware devices, such as ROM and random access memory (RAM) devices, and flash memory devices. Examples of program code include both machine code, as produced, for example, by a compiler, or files containing higher level code that may be executed using an interpreter. The exemplary hardware devices may be configured as at least one software module for performing the operation of the present invention and vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal to provide a see-through input, the terminal comprising:
a touchscreen to display a first application, to sense occurrence of a touch, and generate a touch signal in response to a sensed touch; and
a control unit to determine whether the sensed touch is a general input for the first application or a see-through input for a second application according to the generated touch signal, the general input being different from the see-through input,
wherein the first application is displayed on the touchscreen to at least partially overlap the second application,
wherein a partial portion of the second application associated with a function of the second application and displayed on an area of the touchscreen receiving the sensed touch is processed in response to a determination that the sensed touch is the see-through input,
wherein a partial portion of the first application associated with a function of the first application and displayed on the area of the touchscreen receiving the sensed touch is processed in response to a determination that the sensed touch is the general input,
wherein the partial portion of the second application is overlapped with the partial portion of the first application in the area of the touchscreen receiving the sensed touch,
wherein a transparency of the partial portion of the first application is changed based upon the sensed touch while a transparency of another partial portion of the first application is not changed, and
wherein the see-through input is one of a pressure-based touch greater than a specific pressure, a long touch where the touch is maintained for longer than a specific period of time, and a combination touch including a specific key input of the terminal.

2. The terminal of claim 1, wherein the specific key input of the terminal is an input using a key of the terminal or an input using a touch sensor installed at a side of the terminal or a back of the terminal.

3. The terminal of claim 1, wherein the transparency of the first application is varied such that the first application and the second application are both visible.

4. The terminal of claim 1, wherein the first application is a virtual keyboard and the second application is a web browser.

5. The terminal of claim 1, wherein the first application is an MP3 player program and the second application is a web browser.

6. The terminal of claim 1, wherein the first application is a program for transmitting a large-capacity mail and the second application is a picture viewing program.

7. The terminal of claim 1, wherein the first application is at least partially transparent such that the processing of the portion of the second application is displayed through the transparent first application if the sensed touch is the see-through input.

8. The terminal of claim 1, wherein the touchscreen displays the processing of the partial portion of the first application in the area of the touch screen receiving the sensed touch if the sensed touch is the general input.

9. A terminal to provide a see-through input, the terminal comprising:
a touchscreen to display an input user interface (UI) and an application, to sense occurrence of a touch, and to generate a touch signal in response to a sensed touch; and
a control unit to determine whether the sensed touch is a general input for the input UI or a see-through input for the application according to the generated touch signal, the general input being different from the see-through input,
wherein the input UI is displayed on the touchscreen to at least partially overlap the application,
wherein a partial portion of the application associated with a function of the application and displayed on an area of the touchscreen receiving the sensed touch is processed in response to a determination that the sensed touch is the see-through input,
wherein a partial portion of the input UI associated with a function of the input UI and displayed on the area of the touchscreen receiving the sensed touch is processed in response to a determination that the sensed touch is the general input,
wherein the partial portion of the application is overlapped with the partial portion of the input UI in the area of the touchscreen receiving the sensed touch,
wherein a transparency of the partial portion of the input UI is changed based upon the sensed touch while a transparency of another partial portion of the input UI is not changed, and
wherein the see-through input is one of a pressure-based touch greater than a specific pressure, a long touch where the touch is maintained for longer than a specific period of time, and a combination touch including a specific key input of the terminal.

10. A method for providing a see-through input by a terminal with a touchscreen, the method comprising:
displaying a first application and a second application on the touchscreen;
sensing occurrence of a touch and generating a touch signal in response to a sensed touch;
determining whether the sensed touch is a general input for the first application or a see-through input for the second application according to the generated touch signal, the general input being different from the see-through input;
in response to a determination that the sensed touch is the see-through input, processing a partial portion of the second application associated with a function of the second application and displayed on an area of the touchscreen receiving the sensed touch; and
in response to a determination that the sensed touch is the general input, processing a partial portion of the first application associated with a function of the first application and displayed on the area of the touchscreen receiving the sensed touch,
wherein the first application is displayed on the touchscreen to at least partially overlap the second application,
wherein the partial portion of the second application is overlapped with the partial portion of the first application in the area of the touchscreen receiving the sensed touch,
wherein a transparency of the partial portion of the first application is changed based upon the sensed touch while a transparency of another partial portion of the first application is not changed, and
wherein the see-through input is one of a pressure-based touch greater than a specific pressure, a long touch where the touch is maintained for longer than a specific period of time, and a combination touch including a specific key input of the terminal.

11. The method of claim 10, wherein the specific key input of the terminal is an input using a key of the terminal or an input using a touch sensor installed at a side of the terminal or a back of the terminal.

12. The method of claim 10, wherein the first application is at least partially transparent such that the processing of the portion of the second application is displayed through the transparent first application if the sensed touch is the see-through input.

13. The method of claim 10, wherein the touchscreen displays the processing of the partial portion of the first application in the area of the touch screen receiving the sensed touch if the sensed touch is the general input.

14. A non-transitory computer-readable media, the media including program instructions to implement a method embodied by a terminal with a touchscreen, the terminal for providing a see-through input, the method comprising:
displaying a first application and a second application;
sensing occurrence of a touch and generating a touch signal in response to a sensed touch;
determining whether the sensed touch is a general input for the first application or a see-through input for the second application according to the generated touch signal, the general input being different from the see-through input;
in response to a determination that the sensed touch is the see-through input, processing a partial portion of the second application associated with a function of the second application and displayed on an area of the touchscreen receiving the sensed touch; and
in response to a determination that the sensed touch is the general input, processing a partial portion of the first application associated with a function of the first application and displayed on the area of the touchscreen receiving the sensed touch,
wherein the first application is displayed on the touchscreen to at least partially overlap the second application,
wherein the partial portion of the second application is overlapped with the partial portion of the first application in the area of the touchscreen receiving the sensed touch,
wherein a transparency of the partial portion of the first application is changed based upon the sensed touch while a transparency of another partial portion of the first application is not changed, and
wherein the see-through input is one of a pressure-based touch greater than a specific pressure, a long touch where the touch is maintained for longer than a specific period of time, and a combination touch including a specific key input of the terminal.

15. A terminal to provide a see-through input, the terminal comprising:
a touchscreen to display a first application and a second application, the first application being at least partially transparent and at least partially overlapping the second application, and to generate a signal in response to a sensed touch; and
a control unit to determine whether the sensed touch is a first input for the first application or a second input for a second application according to the generated signal, the first input being different from the second input,
wherein a partial portion of the second application associated with a function of the second application and displayed on an area of the touchscreen receiving the sensed touch is processed in response to a determination that the sensed touch is the second input, wherein a partial portion of the first application associated with the function of the first application and displayed on the area of the touchscreen receiving the sensed touch is processed in response to a determination that the sensed touch is the first input, wherein the partial portion of the second application is overlapped with the partial portion of the first application in the area of the touchscreen receiving the sensed touch, wherein a transparency of the partial portion of the first application is changed based upon the sensed touch while a transparency of another partial portion of the first application is not changed, and wherein the second input is one of a pressure-based touch greater than a specific pressure, a long touch where the touch is maintained for longer than a specific period of time, and a combination touch including a specific key input of the terminal.

16. The terminal of claim 15, wherein the transparency of the first application is varied such that the first application and the second application are both visible.

17. (A method for providing a see-through input by a terminal with a touchscreen, the method comprising:

displaying a first application and a second application on the touchscreen, the first application being at least partially transparent and at least partially overlapping the second application;

generating a touch signal by the terminal in response to a sensed touch;

determining whether the sensed touch is a first input for the first application or a second input for the second application, the first input being different from the second input;

in response to a determination that the sensed touch is the second input, processing a partial portion of the second application associated with a function of the second application and displayed on an area of the touchscreen receiving the sensed touch; and in response to a determination that the sensed touch is the first input, processing a partial portion of the first application associated with a function of the first application and displayed on the area of the touchscreen receiving the sensed touch, wherein the partial portion of the second application is overlapped with the partial portion of the first application in the area of the touchscreen receiving the sensed touch, wherein a transparency of the partial portion of the first application is changed based upon the sensed touch while a transparency of another partial portion of the first application is not changed, and wherein the second input is one of a pressure-based touch greater than a specific pressure, a long touch where the touch is maintained for longer than a specific period of time, and a combination touch including a specific key input of the terminal.

18. The method of claim 17, wherein the second input is the see-through input.

19. The method of claim 17, wherein the transparency of the first application is varied such that both the first application and the second application are visible.

* * * * *